US011898729B2

(12) United States Patent
Ou et al.

(10) Patent No.: US 11,898,729 B2
(45) Date of Patent: Feb. 13, 2024

(54) LIGHTING APPARATUS

(71) Applicant: LEEDARSON LIGHTING CO., LTD., Fujian (CN)

(72) Inventors: Yunfei Ou, Fujian (CN); Aijun Cheng, Fujian (CN); Bin Yi, Fujian (CN); Chengliang Liang, Fujian (CN); Hongxian San, Fujian (CN); Zongyuan Liu, Fujian (CN); Haiyan Chen, Fujian (CN); Yongjun Bao, Fujian (CN)

(73) Assignee: LEEDARSON LIGHTING CO., LTD., Fujian (CN)

( * ) Notice: Subject to any disclaimer, the term of this patent is extended or adjusted under 35 U.S.C. 154(b) by 0 days.

(21) Appl. No.: 17/994,369

(22) Filed: Nov. 27, 2022

(65) Prior Publication Data

US 2023/0417397 A1 Dec. 28, 2023

(30) Foreign Application Priority Data

Jun. 10, 2022 (CN) ......................... 202210656078.3

(51) Int. Cl.
*F21V 21/005* (2006.01)
*F21V 5/00* (2018.01)
*F21V 23/00* (2015.01)
*F21Y 115/10* (2016.01)

(52) U.S. Cl.
CPC ............ *F21V 21/005* (2013.01); *F21V 5/007* (2013.01); *F21V 23/003* (2013.01); *F21Y 2115/10* (2016.08)

(58) Field of Classification Search
CPC ....... F21V 21/005; F21V 5/007; F21V 23/003
See application file for complete search history.

(56) References Cited

U.S. PATENT DOCUMENTS

| | | | | | |
|---|---|---|---|---|---|
| 8,297,788 | B2 * | 10/2012 | Bishop | F21K 9/27 | 362/240 |
| 10,125,934 | B1 * | 11/2018 | Zhang | F21V 29/89 | |
| 10,746,392 | B1 * | 8/2020 | Wu | F21V 23/002 | |
| 11,118,758 | B1 * | 9/2021 | Greenspan | F21V 5/045 | |
| 2004/0246714 | A1 * | 12/2004 | Talamo | E01C 17/00 | 362/225 |
| 2011/0304270 | A1 * | 12/2011 | Scarpelli | F21V 29/507 | 315/113 |
| 2013/0329436 | A1 * | 12/2013 | Suzuki | F21V 15/013 | 29/451 |
| 2013/0335957 | A1 * | 12/2013 | Suzuki | F21V 5/043 | 362/217.14 |
| 2015/0155427 | A1 * | 6/2015 | Jang | F21V 5/007 | 438/27 |

* cited by examiner

*Primary Examiner* — Bryon T Gyllstrom
(74) *Attorney, Agent, or Firm* — Chun-Ming Shih; LANWAY IPR SERVICES

(57) ABSTRACT

A lighting apparatus includes a driver module, a light source, a main housing and an optical plate. The driver module converts an external power to a driving current. The light source includes multiple LED chips. The light source is coupled to to the drive module to emit a light. The main housing is used for disposing the driver module and the light source. The optical plate is detachably inserted into a sliding track of the main housing via a lateral opening of the main housing so that the optical plate is replaceable. The optical plate changes a light direction of the light emitted by the light source to a light opening. A first surface of the light opening is substantially perpendicular to a second surface of the lateral opening.

18 Claims, 10 Drawing Sheets

LIGHTING APPARATUS

FIELD

The present invention is related to a lighting apparatus, and more particularly related to a lighting apparatus with a replaceable unit.

BACKGROUND

The time when the darkness is being lighten up by the light, human have noticed the need of lighting up this planet. Light has become one of the necessities we live with through the day and the night. During the darkness after sunset, there is no natural light, and human have been finding ways to light up the darkness with artificial light. From a torch, candles to the light we have nowadays, the use of light have been changed through decades and the development of lighting continues on.

Early human found the control of fire which is a turning point of the human history. Fire provides light to bright up the darkness that have allowed human activities to continue into the darker and colder hour of the hour after sunset. Fire gives human beings the first form of light and heat to cook food, make tools, have heat to live through cold winter and lighting to see in the dark.

Lighting is now not to be limited just for providing the light we need, but it is also for setting up the mood and atmosphere being created for an area. Proper lighting for an area needs a good combination of daylight conditions and artificial lights. There are many ways to improve lighting in a better cost and energy saving. LED lighting, a solid-state lamp that uses light-emitting diodes as the source of light, is a solution when it comes to energy-efficient lighting. LED lighting provides lower cost, energy saving and longer life span.

The major use of the light emitting diodes is for illumination. The light emitting diodes is recently used in light bulb, light strip or light tube for a longer lifetime and a lower energy consumption of the light. The light emitting diodes shows a new type of illumination which brings more convenience to our lives. Nowadays, light emitting diode light may be often seen in the market with various forms and affordable prices.

After the invention of LEDs, the neon indicator and incandescent lamps are gradually replaced. However, the cost of initial commercial LEDs was extremely high, making them rare to be applied for practical use. Also, LEDs only illuminated red light at early stage. The brightness of the light only could be used as indicator for it was too dark to illuminate an area. Unlike modern LEDs which are bound in transparent plastic cases, LEDs in early stage were packed in metal cases.

In 1878, Thomas Edison tried to make a usable light bulb after experimenting different materials. In November 1879, Edison filed a patent for an electric lamp with a carbon filament and keep testing to find the perfect filament for his light bulb. The highest melting point of any chemical element, tungsten, was known by Edison to be an excellent material for light bulb filaments, but the machinery needed to produce super-fine tungsten wire was not available in the late 19th century. Tungsten is still the primary material used in incandescent bulb filaments today.

Early candles were made in China in about 200 BC from whale fat and rice paper wick. They were made from other materials through time, like tallow, spermaceti, colza oil and beeswax until the discovery of paraffin wax which made production of candles cheap and affordable to everyone. Wick was also improved over time that made from paper, cotton, hemp and flax with different times and ways of burning. Although not a major light source now, candles are still here as decorative items and a light source in emergency situations. They are used for celebrations such as birthdays, religious rituals, for making atmosphere and as a decor.

Illumination has been improved throughout the times. Even now, the lighting device we used today are still being improved. From the illumination of the sun to the time when human can control fire for providing illumination which changed human history, we have been improving the lighting source for a better efficiency and sense. From the invention of candle, gas lamp, electric carbon arc lamp, kerosene lamp, light bulb, fluorescent lamp to LED lamp, the improvement of illumination shows the necessity of light in human lives.

There are various types of lighting apparatuses. When cost and light efficiency of LED have shown great effect compared with traditional lighting devices, people look for even better light output. It is important to recognize factors that can bring more satisfaction and light quality and flexibility.

People rely on various light devices to take a modern life today. In the past, people may only expect the function of illumination. Now, people hope light devices to be equipped with more functions to satisfy different needs.

Therefore, it is beneficial is more flexible design may be added to light devices. That will make human life more convenient and brings more value to the world.

SUMMARY

In some embodiments, a lighting apparatus includes a driver module, a light source, a main housing and an optical plate.

The driver module converts an external power to a driving current.

The light source includes multiple LED chips.

The light source is coupled to to the drive module to emit a light.

The main housing is used for disposing the driver module and the light source.

The optical plate is detachably inserted into a sliding track of the main housing via a lateral opening of the main housing so that the optical plate is replaceable.

The optical plate changes a light direction of the light emitted by the light source to a light opening.

A first surface of the light opening is substantially perpendicular to a second surface of the lateral opening.

In some embodiments, the optical plate is a lens layer.

In some embodiments, the lens layer has multiple lenses respectively arranged to cover the multiple LED chips.

In some embodiments, a first group of the multiple lenses located in a central area of the lens layer are condensing lenses.

A second group of the multiple lenses located in a peripheral area of the lens layer are diffusing lenses.

In some embodiments, the optical plate is a diffusion layer.

In some embodiments, the light source includes a first light module and a second light module.

There are two optical plates for respectively inserting into two sliding tracks of the main housing.

In some embodiments, the two light modules are disposed on two sides of the driver module.

In some embodiments, the main housing has two lateral covers on two sides of the main housing to fix the driver module and the light source.

In some embodiments, the lateral openings are disposed on one of the lateral covers.

In some embodiments, the main housing has a support plate with multiple convex parts engaging the optical plate.

The support plate has multiple concave parts for placing the first light module and the second light module.

In some embodiments, an emergency module is detachably inserted into a function track of the main housing to supply power to the light source under an emergency condition.

In some embodiments, a communication module is detachably inserted into a function track of the main housing to empower the driver module to communicate with an external device.

In some embodiments, the light source is detachably inserted via a light track of the main housing so that the light source is replaceable.

In some embodiments, the light source has an insulation layer covering the LED chips.

In some embodiments, the insulation layer is transparent and containing multiple lenses.

In some embodiments, the light source and the optical plate are integrated as a integrated module to be detachably inserting into the sliding track so that the integrated module is replaceable.

In some embodiments, the optical plate has an identification unit coupled to the driver module to indicate a type of the optical plate when the optical plate is inserted into the sliding track.

In some embodiments, the identification unit is a digital label stored in the optical plate.

The driver module retrieves the digital label to adjust the driving current to fit the type of the optical plate.

In some embodiments, the identification unit is a physical structure.

The driver module recognizes the physical structure to adjust the driving current to fit the type of the optical plate.

In some embodiments, the optical plate has multiple optical parts respectively corresponding to the multiple LED chips.

Each optical part has a concave portion for containing one corresponding LED chip.

Each optical part has a flat part engaging a base plate of the light source.

The concave portion has an inner surface with a first curve surface enclosing the corresponding LED chip.

Each optical part has an outer surface with a second curve surface with a same curve direction as the first curve surface.

DETAILED DESCRIPTION

Figure 5:
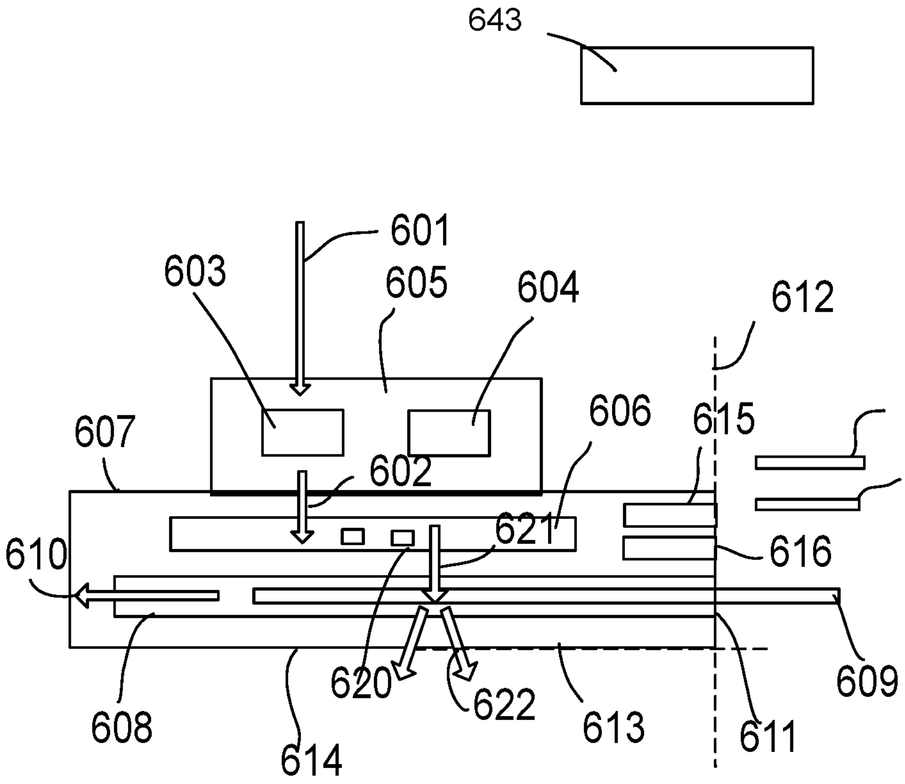
FIG. 5 illustrates a lighting apparatus embodiment.

In FIG. 5, a lighting apparatus includes a driver module 605, a light source 606, a main housing 607 and an optical plate 609.

The driver module 606 converts an external power 601 to a driving current 602.

The light source 606 includes multiple LED chips 620.

The light source 606 is coupled to to the drive module 605 to emit a light 621.

The main housing 605 is used for disposing the driver module 605 and the light source 602.

In some embodiments, the main housing may include multiple units assembled together.

The optical plate 609 is detachably inserted into a sliding track 608 of the main housing 607 via a lateral opening 611 of the main housing 607 so that the optical plate 609 is replaceable.

For example, users may change another optical plate for creating a different light rendering effect, e.g. some for creating a light beam while some other for creating a soft diffusion light.

The optical plate changes a light direction 622 of the light 621 emitted by the light source 606 to a light opening 614.

A first surface 613 of the light opening 614 is substantially perpendicular to a second surface 612 of the lateral opening 611. Please be noted that the substantially perpendicular" may refer to a degree between 60 degrees to 120 degrees.

In some embodiments, the optical plate 609 is a lens layer.

Figure 6:
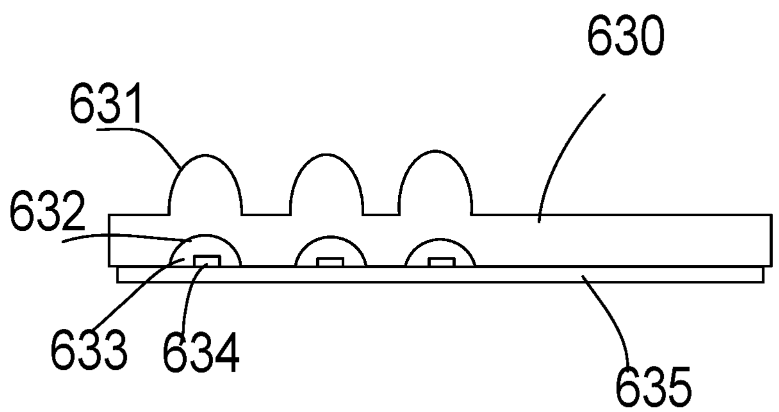
FIG. 6 illustrates an example of an optical plate.

FIG. 6 shows such an example. In FIG. 6, the optical plate 630 is a lens layer with multiple lenses 631 covering multiple LED chips 634

In some embodiments, the lens layer has multiple lenses respectively arranged to cover the multiple LED chips.

In some embodiments, a first group of the multiple lenses located in a central area of the lens layer are condensing lenses.

Figure 7:
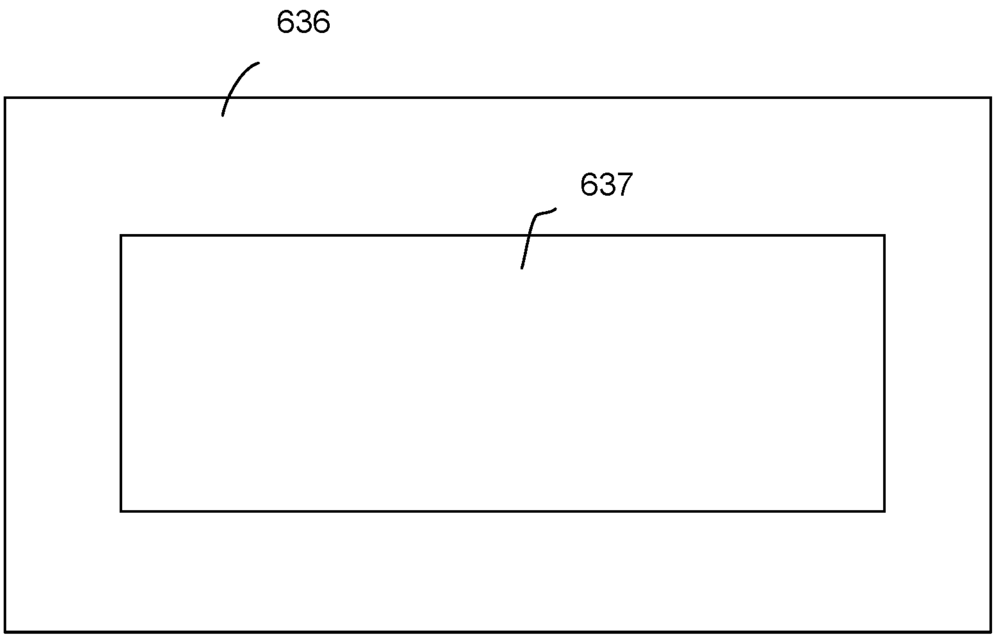
FIG. 7 illustrates lens distribution of two types in an optical plate.

FIG. 7 shows such an example. In FIG. 7, lenses in the central area 637 are condensing lenses and lenses in the peripheral area 636 are diffusion lenses.

A second group of the multiple lenses located in a peripheral area of the lens layer are diffusing lenses.

In some embodiments, the optical plate is a diffusion layer.

In some embodiments, the light source includes a first light module and a second light module.

Figure 1:
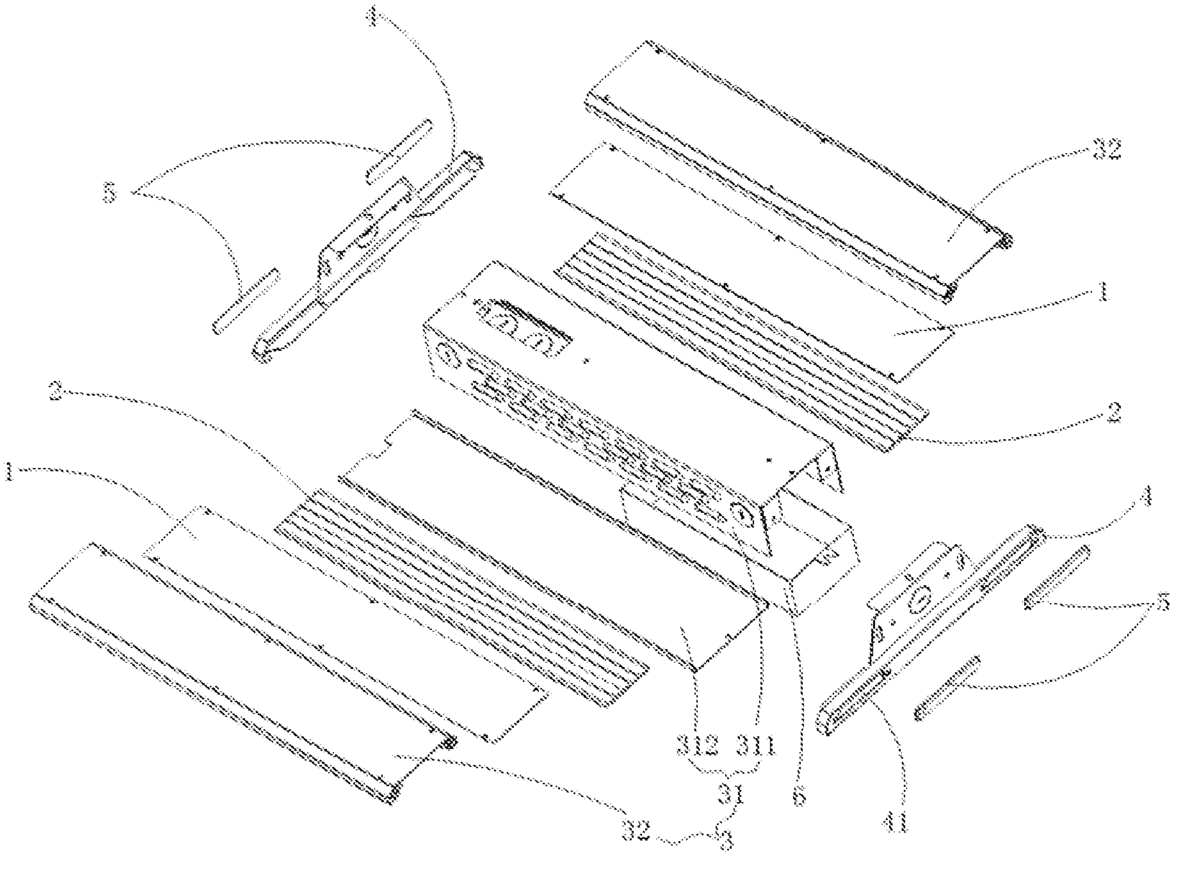
FIG. 1 illustrates an exploded view of a lighting apparatus embodiment.

FIG. 1 shows such an example. In FIG. 1, there are two light modules 2 on two sides of the driver module 31.

There are two optical plates for respectively inserting into two sliding tracks of the main housing.

In FIG. 1, there are two optical plates 1 for inserting from two lateral openings 41.

In some embodiments, the two light modules are disposed on two sides of the driver module.

In some embodiments, the main housing has two lateral covers on two sides of the main housing to fix the driver module and the light source.

In FIG. 1, the two lateral covers 4 are placed on two sides of the main housing 3.

In some embodiments, the lateral openings 41 are disposed on one of the lateral covers 4.

In some embodiments, the main housing has a support plate with multiple convex parts engaging the optical plate.

The support plate has multiple concave parts for placing the first light module and the second light module.

Figure 8:
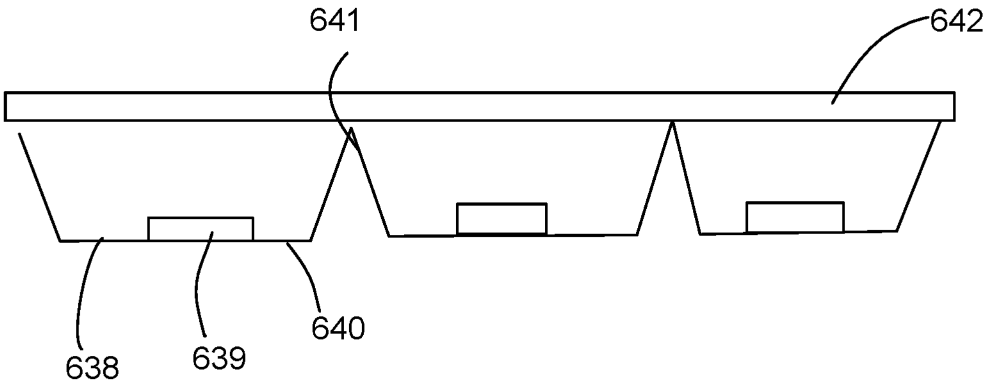
FIG. 8 illustrates a support structure of a housing.

FIG. 8 shows such an example. In FIG. 8, a support plate 640 has multiple convex parts 641 engaging the optical plate 642. The support plate 640 has multiple concave parts 638 for disposing multiple light modules 639.

Such design makes the overall structure more robust.

In FIG. 5, an emergency module 617, e.g. a battery with a circuit, is detachably inserted into a function track 615 of the main housing to supply power to the light source 606 under an emergency condition.

In some embodiments, a communication module 618 is detachably inserted into a function track 616 of the main housing to empower the driver module 605 to communicate with an external device.

The driver module 604 may includes a current generator 603 and a controller 604.

The controller 604 may be adjusted with manual switch or external wireless commands from an external device 643 to change a color temperature, a color or light intensity of the light source.

Multiple types of LED chips with different color temperatures may be disposed and supplied with currents of different ratios to render a desired mixed light.

In some embodiments, the light source is detachably inserted via a light track of the main housing so that the light source is replaceable.

In some embodiments, the light source has an insulation layer covering the LED chips.

In some embodiments, the insulation layer is transparent and containing multiple lenses.

Figure 9:
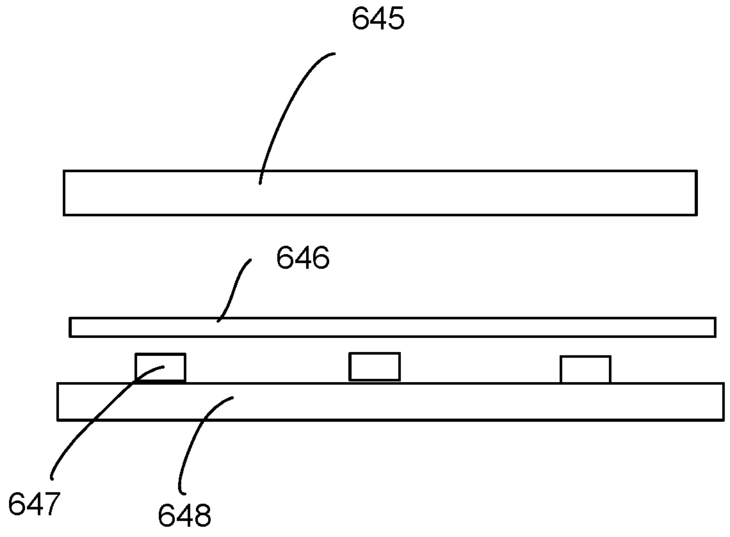
FIG. 9 illustrates an insulation layer example.

FIG. 9 shows an insulation layer 646 is integrated with the light source 648. Multiple lenses may be formed on the insulation layer 646 corresponding to and covering underlying LED chips 647.

The insulation layer 646 may prevent users from electric danger when the light source is detached from the lighting apparatus. Meanwhile, another optical plate 645 may be installed to create a more complicated visual effect.

In some embodiments, the light source and the optical plate are integrated as a integrated module to be detachably inserting into the sliding track so that the integrated module is replaceable.

In some embodiments, the optical plate has an identification unit coupled to the driver module to indicate a type of the optical plate when the optical plate is inserted into the sliding track.

In some embodiments, the identification unit is a digital label stored in the optical plate.

The driver module retrieves the digital label to adjust the driving current to fit the type of the optical plate.

In some embodiments, the identification unit is a physical structure.

The driver module recognizes the physical structure to adjust the driving current to fit the type of the optical plate.

Figure 10:
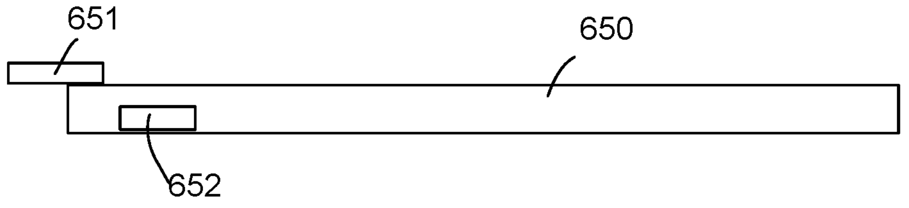
FIG. 10 illustrates an identification unit disposed on an optical plate.

FIG. 10 shows an optical plate 650 with a physical structure 651 of an identification unit. When the optical plate 650 is inserted, the physical structure 651 may trigger a corresponding unit to render an electrical signal to be received by the driver module so that the driver module knows which type of the optical plate is inserted.

FIG. 10 also shows a digital label 652, e.g. a memory storage for storing a type information.

In some embodiments, the optical plate has multiple optical parts respectively corresponding to the multiple LED chips.

Each optical part has a concave portion for containing one corresponding LED chip.

Each optical part has a flat part engaging a base plate of the light source.

The concave portion has an inner surface with a first curve surface enclosing the corresponding LED chip.

Each optical part has an outer surface with a second curve surface with a same curve direction as the first curve surface.

FIG. 6 shows that the optical plate 630 has multiple optical parts. Specifically, each optical part has a concave part 633 for enclosing the LED chip 634. An inner curve surface 632 is formed inside the concave part 633. The exterior surface 631 of the optical parts have a same curve direction, e.g. both are downwardly curving shape.

FIG. 1 shows a lighting apparatus embodiment.

In FIG. 1, the lighting apparatus has a main housing 3 with multiple housing parts 32, 312, 311, 6.

Two lateral covers 4 are disposed on two sides of the main housing 3 to fix all components together by clipping them therebetween.

There are two optical plates 2 inserted to the main housing 3 via two later openings 41. Two covers 5 are used to conceal the lateral openings 41.

Two light sources 1 are disposed for emitting lights.

Figure 2:
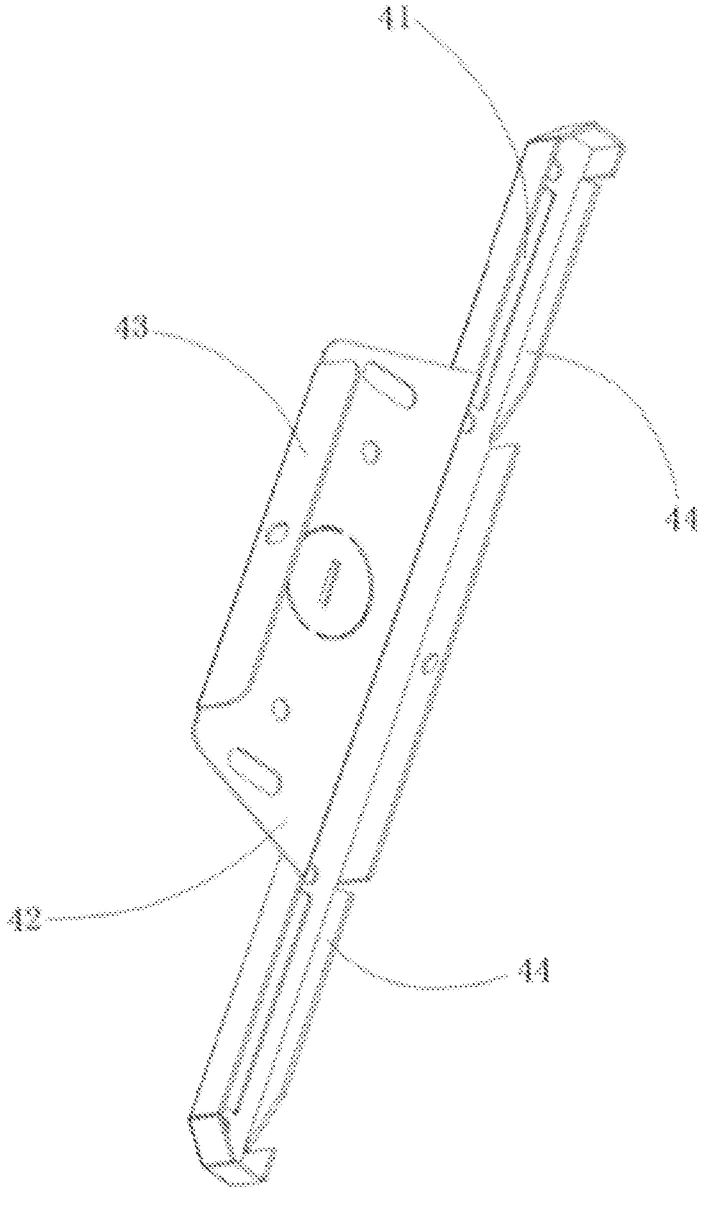
FIG. 2 illustrates a component for fixing an optical plate.

FIG. 2 shows an example of the lateral cover mentioned above. The lateral cover has two lateral openings 41 for inserting the optical plates.

There are guiding structures 44 forming the sliding tracks. Connector structures 42, 43 are used for concealing the components of the driver module.

Figure 3:
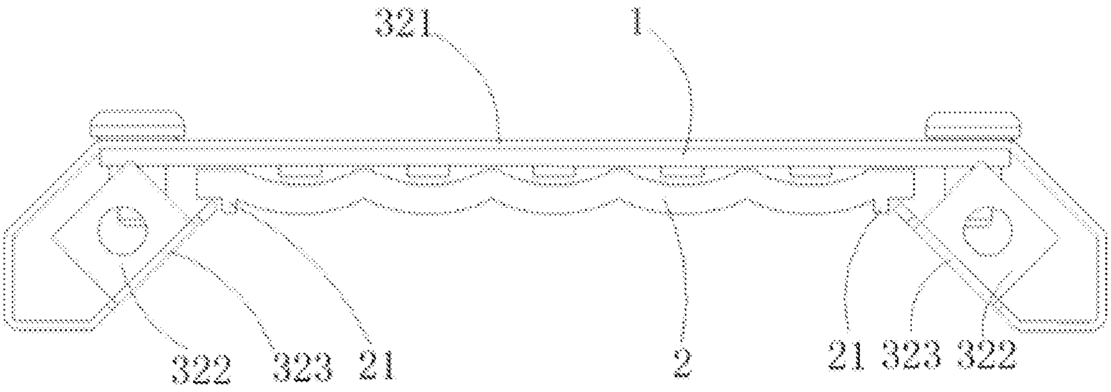
FIG. 3 illustrates a side view of an embodiment for illustrating a lens plate design.

FIG. 3 shows an example for arranging components.

In FIG. 3, a light source 1 is covered by a curve shape lens plate 2 similar to the example of FIG. 6.

There are stop structures 21 on the lens plate 2 to clip on hook structures 323, 323 of the main housing.

Figure 4:
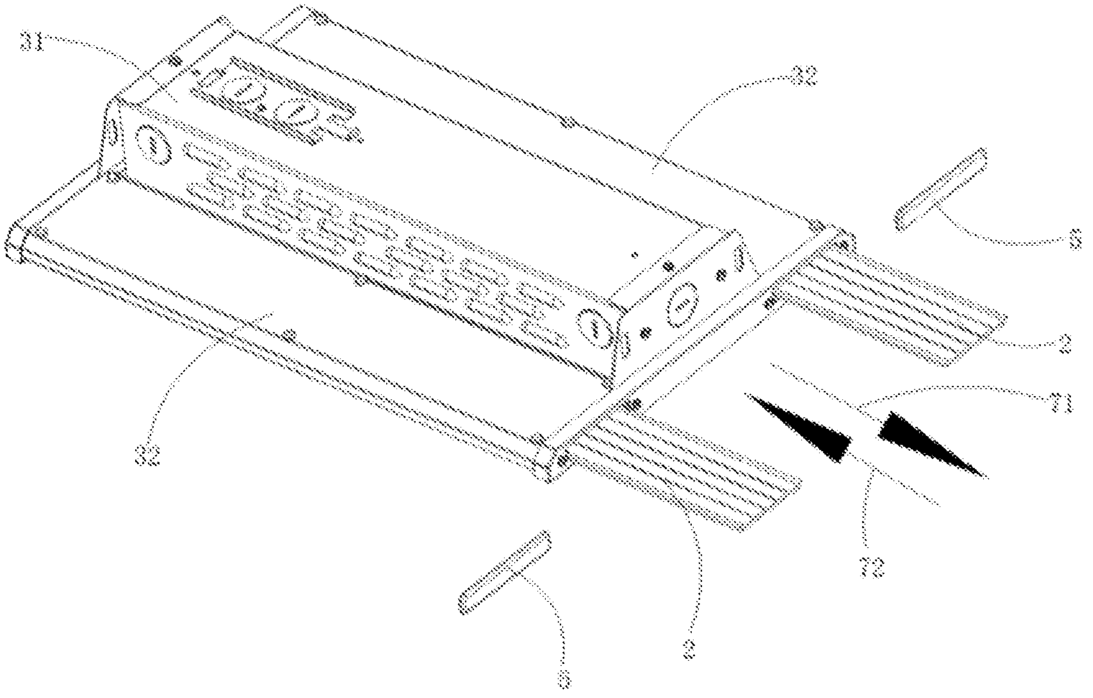
FIG. 4 illustrates an operation diagram showing insertion of an optical plate.

FIG. 4 shows an insertion operation. The two directions 71, 72 shows two ways to detach or attach the optical plates 2. Two lateral covers 5 are used for concealing the lateral openings. Other components are mentioned above and are not repeated again.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

The invention claimed is:

1. A lighting apparatus, comprising:

a driver module for converting an external power to a driving current;

a light source comprising multiple LED chips, wherein the light source is coupled to the drive module to emit a light;

a main housing for disposing the driver module and the light source; and an optical plate for detachably inserting into a sliding track of the main housing via a lateral opening of the main housing so that the optical plate is replaceable, wherein the optical plate changes a light direction of the light emitted by the light source to a light opening, wherein a first surface of the light opening is substantially perpendicular to a second surface of the lateral opening, wherein the light source includes a first light module and a second light module, wherein there are two optical plates for respectively inserting into two sliding tracks of the main housing, wherein the two light modules are disposed on two sides of the driver module.

2. The lighting apparatus of claim 1, wherein the optical plate is a lens layer.

3. The lighting apparatus of claim 2, wherein the lens layer has multiple lenses respectively arranged to cover the multiple LED chips.

4. The lighting apparatus of claim 2, wherein a first group of the multiple lenses located in a central area of the lens layer are condensing lenses, wherein a second group of the multiple lenses located in a peripheral area of the lens layer are diffusing lenses.

5. The lighting apparatus of claim 1, wherein the optical plate is a diffusion layer.

6. The lighting apparatus of claim 1, wherein the main housing has two lateral covers on two sides of the main housing to fix the driver module and the light source.

7. The lighting apparatus of claim 6, wherein the lateral openings are disposed on one of the lateral covers.

8. The lighting apparatus of claim 6, wherein the main housing has a support plate with multiple convex parts engaging the optical plate, wherein the support plate has multiple concave parts for placing the first light module and the second light module.

9. The lighting apparatus of claim 1, wherein an emergency module is detachably inserted into a function track of the main housing to supply power to the light source under an emergency condition.

10. The lighting apparatus of claim 1, wherein a communication module is detachably inserted into a function track of the main housing to empower the driver module to communicate with an external device.

11. The lighting apparatus of claim 1, wherein the light source is detachably inserted via a light track of the main housing so that the light source is replaceable.

12. The lighting apparatus of claim 11, wherein the light source has an insulation layer covering the LED chips.

13. The lighting apparatus of claim 12, wherein the insulation layer is transparent and containing multiple lenses.

14. The lighting apparatus of claim 1, wherein the light source and the optical plate are integrated as a integrated module to be detachably inserting into the sliding track so that the integrated module is replaceable.

15. The lighting apparatus of claim 1, wherein the optical plate has an identification unit coupled to the driver module to indicate a type of the optical plate when the optical plate is inserted into the sliding track.

16. The lighting apparatus of claim 15, wherein the identification unit is a digital label stored in the optical plate, wherein the driver module retrieves the digital label to adjust the driving current to fit the type of the optical plate.

17. The lighting apparatus of claim 15, wherein the identification unit is a physical structure, wherein the driver module recognizes the physical structure to adjust the driving current to fit the type of the optical plate.

18. The lighting apparatus of claim 1, wherein the optical plate has multiple optical parts respectively corresponding to the multiple LED chips, wherein each optical part has a concave portion for containing one corresponding LED chip, wherein each optical part has a flat part engaging a base plate of the light source, wherein the concave portion has an inner surface with a first curve surface enclosing the corresponding LED chip, wherein each optical part has an outer surface with a second curve surface with a same curve direction as the first curve surface.

* * * * *